(12) United States Patent
Li

(10) Patent No.: US 7,710,669 B2
(45) Date of Patent: May 4, 2010

(54) ETENDUE EFFICIENT COMBINATION OF MULTIPLE LIGHT SOURCES

(75) Inventor: Kenneth K. Li, Castaic, CA (US)

(73) Assignee: Wavien, Inc., Valencia, CA (US)

( * ) Notice: Subject to any disclaimer, the term of this patent is extended or adjusted under 35 U.S.C. 154(b) by 0 days.

(21) Appl. No.: 11/351,013

(22) Filed: Feb. 9, 2006

(65) Prior Publication Data

US 2006/0126178 A1 Jun. 15, 2006

Related U.S. Application Data

(63) Continuation-in-part of application No. 11/240,169, filed on Sep. 30, 2005, now Pat. No. 7,130,122, which is a continuation of application No. 10/347,522, filed on Jan. 21, 2003, now Pat. No. 6,982,830, which is a continuation of application No. 09/814,970, filed on Mar. 23, 2001, now Pat. No. 6,587,269.

(60) Provisional application No. 60/227,312, filed on Aug. 24, 2000, provisional application No. 60/246,583, filed on Nov. 8, 2000, provisional application No. 60/651,079, filed on Feb. 9, 2005.

(51) Int. Cl.
G02B 5/04 (2006.01)

(52) U.S. Cl. .................................. 359/834; 353/33

(58) Field of Classification Search .............. 353/33, 353/20; 359/638, 640, 833, 834, 837, 583, 359/495, 496, 498

See application file for complete search history.

(56) References Cited

U.S. PATENT DOCUMENTS

| 2,511,102 A * | 6/1950 | Clouser ................... 355/82 |
| 4,173,412 A | 11/1979 | Ramsay et al. |
| 5,301,030 A | 4/1994 | Ko |
| 5,303,083 A | 4/1994 | Blanchard et al. |
| 5,513,023 A | 4/1996 | Fritz et al. |
| 5,625,738 A | 4/1997 | Magarill |
| 5,712,694 A | 1/1998 | Taira et al. |
| 5,751,480 A | 5/1998 | Kitagishi |
| 5,884,991 A | 3/1999 | Levis et al. |
| 5,995,284 A | 11/1999 | Vanderwerf |
| 6,053,615 A | 4/2000 | Peterson et al. |
| 6,104,454 A | 8/2000 | Hiyama et al. |
| 6,139,157 A | 10/2000 | Okuyuma |
| 6,224,216 B1 | 5/2001 | Parker et al. |
| 6,247,814 B1 | 6/2001 | Lin |
| 6,398,363 B1 * | 6/2002 | Ho et al. ................... 353/20 |

(Continued)

FOREIGN PATENT DOCUMENTS

CA 2290860 5/2000

(Continued)

*Primary Examiner*—Stephone B Allen
*Assistant Examiner*—Derek S Chapel
(74) *Attorney, Agent, or Firm*—Fulbright & Jaworski, LLP

(57) ABSTRACT

A multi-colored illumination system including a beam combiner. The beam combiner includes two triangular prisms and a filter for transmitting a first light and reflecting a second light, each light having a different wavelength. The beam combiner combines the transmitted first light and the reflected light to provide a combined beam. The six surfaces of each of the triangular prism of the beam combiner are polished, thereby combining the lights without increasing etendue of the multi-colored illumination system.

18 Claims, 12 Drawing Sheets

U.S. PATENT DOCUMENTS

| | | | |
|---|---|---|---|
| 6,411,449 B1 * | 6/2002 | Hashizume et al. | 359/831 |
| 6,587,269 B2 | 7/2003 | Li | |
| 7,131,735 B2 * | 11/2006 | Yokoyama | 353/98 |
| 2002/0012101 A1 * | 1/2002 | Takeuchi et al. | 353/31 |
| 2002/0196414 A1 * | 12/2002 | Manni et al. | 353/31 |
| 2003/0147055 A1 * | 8/2003 | Yokoyama | 353/98 |
| 2005/0036203 A1 | 2/2005 | Ferri et al. | |

FOREIGN PATENT DOCUMENTS

| | | |
|---|---|---|
| CN | 1273641 A | 11/2000 |
| CN | 1453606 A | 11/2003 |
| EP | 0 584 802 A1 | 3/1994 |
| EP | 0 691 552 A2 | 1/1996 |
| JP | 9-326205 | 12/1997 |
| WO | WO-93/24857 A1 | 12/1993 |
| WO | WO-95/27919 A2 | 10/1995 |

* cited by examiner

ETENDUE EFFICIENT COMBINATION OF MULTIPLE LIGHT SOURCES

CROSS REFERENCE TO RELATED APPLICATIONS

The present application claims benefit of U.S. Provisional Application No. 60/651,079 filed Feb. 9, 2005, and the present application is a continuation-in-part of application Ser. No. 11/240,169 filed Sep. 30, 2005 now U.S. Pat. No. 7,130,122, which is a continuation of application Ser. No. 10/347,522 filed Jan. 21, 2003, now U.S. Pat. No. 6,982,830, which is a continuation of application Ser. No. 09/814,970, filed Mar. 23, 2001, now U.S. Pat. No. 6,587,269 which claims benefit of U.S. Provisional Application No. 60/227,312 filed Aug. 24, 2000 and 60/246,683 filed Nov. 8, 2000, all of which are incorporated by reference in their entireties.

FIELD OF THE INVENTION

The present invention relates an improved system and methodology for providing multi-colored illumination without increasing the etendue of the system.

BACKGROUND OF INVENTION

A liquid crystal display (hereafter "LCD") is a known device used to control the transmission of polarized light energy. The LCD may be either clear or opaque depending on the current applied to the LCD. Because of this functionality, projection system commonly use an array containing numerous LCDs to form an image source. In particular, the projection system inputs high intensity polarized light energy to the LCD array (also called an imager), which selectively transmits some of the inputted light energy to form a projection of a desired image. Because a single LCD is relatively small, numerous LCDs can be packed together into the array, thereby forming an imager that can produce a high resolution image.

As suggested above, a projection system must first polarize the light input to the LCD. However, light energy from a light source, such as a bulb, may have either p-polarization or s-polarization. Since this light input to the LCD imager must be in one orientation (i.e., either p-polarization or s-polarization), the LCD projector generally uses only half of the light energy from the light source. However, it is desirable in projection systems to maximize the brightness and intensity of the light output. In response, various methodologies have been developed to capture the light energy of unusable polarization, to convert the polarization of this captured light energy, and then to redirect the converted light energy toward the LD imager. These known polarization recovery methodologies involve creating an expanded beam of light in which the unused portion of the light (of undesired polarity) is sent through a half-wave plate to change the polarization and then recombined with the original polarized beam. Unfortunately, the implementation of these known methodologies requires complex, bulky systems, which usually include 2-dimensional lens arrays and an array of polarization beam splitters. Furthermore, the known methodologies lose much of the light energy and, therefore, compromise the projector's goal of producing a high intensity output.

Light pipe systems have been used to separate white light into their individual red (R), blue (B), and green (G) components using light pipes, prisms, and beam splitters. The reverse of such a system can be used in combining multiple light sources with distinct spectrum without increase in etendue. Therefore, it is desirable to have a system the provides multi-colored illumination without the need to increase etendue.

SUMMARY OF THE INVENTION

In response to these needs, the present invention uses a waveguide system to perform the polarization recovery function in an LCD projection system. In particular, the present invention's waveguide polarization recovery system both polarizes the input light energy for use with an LCD imager and converts the polarity of unusable light energy to add to the illumination of the LCD imager. The compact polarization recovery waveguide system generally includes the following optical components that are integrated into a single unit: (1) an input waveguide that inputs non-polarized light energy into the system; (2) an output waveguide that removes polarized light energy from the system; (3) a polarized beam splitter that receives the light energy from the input waveguide and transmits light energy of a first polarization type and reflects light energy of a second polarization type, and (4) a wave plate that modifies the polarization of either the transmitted or reflected light energy. The polarization recovery system also generally includes one or more mirrors that are positioned as needed to direct the transmitted and/or reflected light energy to the output waveguide. The input and output waveguides may be shaped as needed by the projection system. For example, either one or both of the input and output waveguides may be tapered up or down as needed to produce a desired image.

In the waveguide polarization recovery system, the input and output waveguides are configured to have either a substantially parallel or a substantially perpendicular orientation. In configurations in which the input and output waveguides are substantially parallel, the output waveguide directly receives light energy transmitted by the beam splitter. In this way, light energy enters and exits the polarization recovery system in substantially the same direction. Alternatively, the input and the output waveguides may be positioned substantially perpendicular to each other such that the light energy exits the polarization recovery system at a right angle from the direction it enters. In configurations having input and output waveguides of perpendicular orientation, a mirror receives the light energy transmitted by the polarized beam splitter and redirects this energy by 90° C. toward the output waveguide.

The polarization recovery waveguide system of the present invention combines the above-enumerated list of optical components into a single, compact unit. In one embodiment, the waveguide polarization recovery system further includes one or more "gaps" of optically clear material positioned between the optical components to encourage the occurrence of total internal reflection that minimizes the loss of the optical energy by the system.

In the field of LED illumination, each LED generally emits a single color. For multi-color applications, N LEDs are used, typically $N \geq 2$. Typically, N LEDs, e.g., 2 LEDs, are place side by side and coupled into the same target. By varying the output of each LED, the desired color and brightness can be achieved. To combine color in this manner, the etendue of a typical illumination system must be increased as the area of emission is increased. Accordingly, in accordance with an embodiment of the present invention, a light pipe based system combines the colors without increasing the etendue.

In accordance with an embodiment of the present system, a multi-colored illumination system comprising a beam combiner. The beam combiner comprises two triangular prisms and a filter for transmitting a first light and reflecting a second light, each light having a different wavelength. The beam combiner combines the transmitted first light and the reflected light to provide a combined beam. Each surface of the triangular prisms is polished, thereby combining the lights without increasing etendue of the multi-colored illumination system.

In accordance with an embodiment of the present invention, a multi-colored illumination system comprises n beam combiners for combining n+1 lights, where N>2, each light having a different wavelength, and a low index glue or air gap provided between each beam combiner. Each beam combiner comprises two triangular prisms, each surface of the triangular prisms being polished and a filter for transmitting a combined beam received from a previous beam combiner and reflecting a new light from n+1 lights which has not been previously transmitted or reflected. The beam combiner combines the transmitted combined beam and the reflected new light to provide a new combined beam. The new combined beam is provided to the next beam combiner if the beam combiner is not the last beam combiner or outputs the new combined beam if the beam combiner is the last beam combiner. The low index glue or air gap between each beam combiner enables the multi-colored illumination system to combined all of the lights without increasing etendue of the multi-colored illumination system.

In accordance with an embodiment of the present invention, a multi-colored illumination system comprises at least two LEDs, a light pipe associated with each LED, an X-cube and a low index glue or air gap. The two LEDs provide two lights having two different wavelengths. The X-cube combines the lights received from each light pipe associated with a LED to provide an output beam. The low index glue or air gap is provided between each of the light pipe and the X-cube, thereby combining the lights without increasing etendue of the multi-colored illumination system.

In accordance with an embodiment of the present invention, a light engine comprising the multi-colored illumination system as aforesaid.

In accordance with an embodiment of the present invention, a projection display system comprising the light engine as aforesaid, at least one light modulator panel for modulating light in accordance with a display signal; and a projection lens for projecting the modulated light onto a display screen.

In accordance with an embodiment of the present invention, a method for multi-colored illumination comprises the steps of combining by a first beam combiner a first light transmitted by a first filter and a second light reflected by the first filter to provide a combined beam; combining by a second beam combiner the combined beam transmitted by a second filter and a third light reflected by the second filter to provide an output beam, each light having different wavelength; and providing a low index glue or air gap between the beam combiners, thereby combining the lights without increasing etendue.

In accordance with an embodiment of the present invention, a method for multi-colored illumination comprises the steps of combining by an X-cube at least two lights having two different wavelengths received from corresponding two light pipes; and providing a low index glue or air gap between each light pipe and the X-cube, thereby combining the lights without increasing etendue.

BRIEF DESCRIPTION OF THE DRAWINGS

These and other advantages of the present invention will be described in detail with reference to the following drawings in which like reference numbers refer to like elements.

DETAILED DESCRIPTION OF THE EMBODIMENTS

Figure 1:
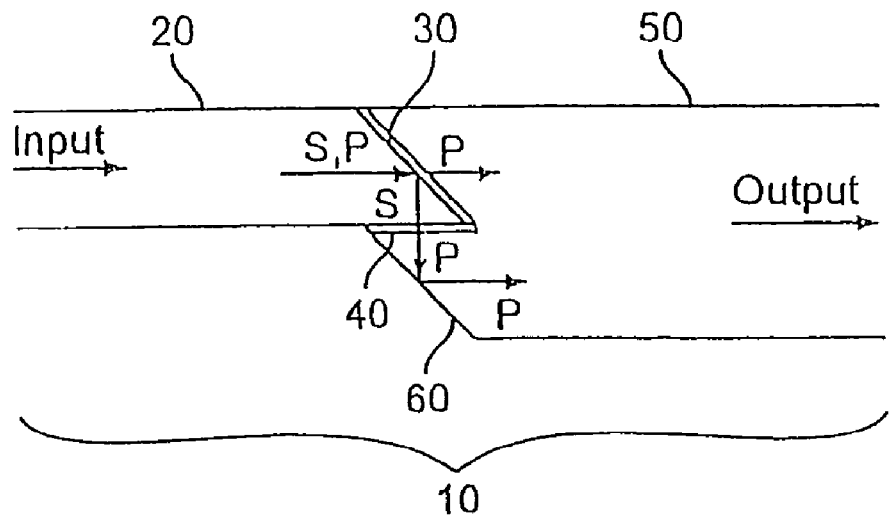
FIGS. 1-4 and 6-10 are schematic diagrams of the waveguide polarization recovery system in accordance with various embodiments of the present invention.
Figure 2:
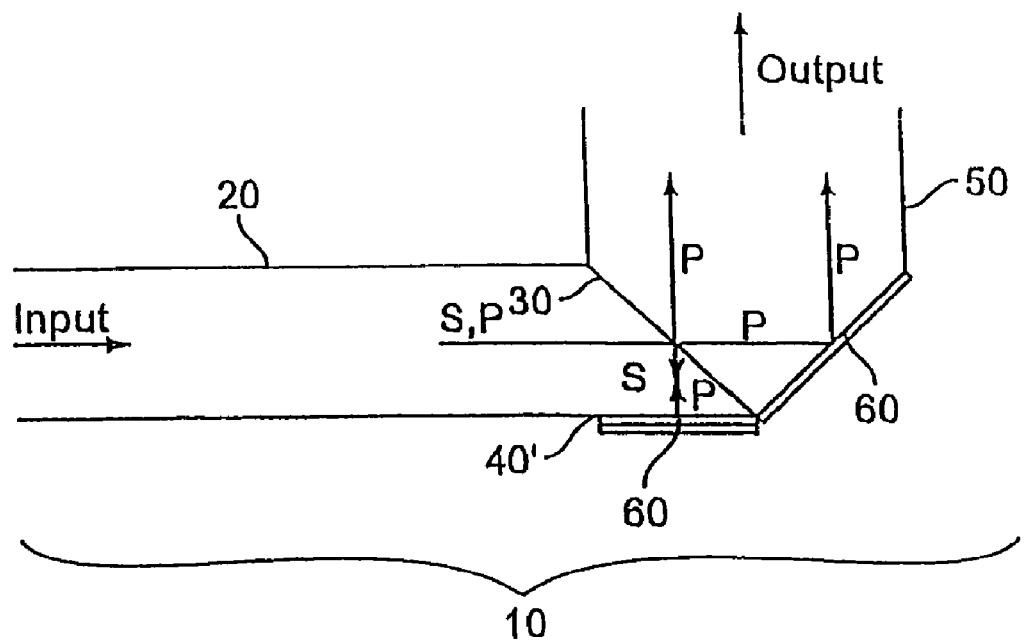

As illustrated in FIGS. 1-4 and 6-10, in accordance with embodiments of the present invention, a compact waveguide polarization recovery system 10 comprises an input waveguide 20, a polarizing beam splitter ("PBS") 30, a wave plate 40, which can be a half-wave plate, or a quarter-wave plate depending on the configuration, and an output waveguide 50. The waveguide polarization recovery system 10 generally further includes mirrors 60 as needed to direct the light stream between the input and output waveguides, 20 and 50. The following discussion first summarizes several possible configurations for the waveguide polarization recovery system 10 and then describes the individual elements in greater detail.

Figure 3:
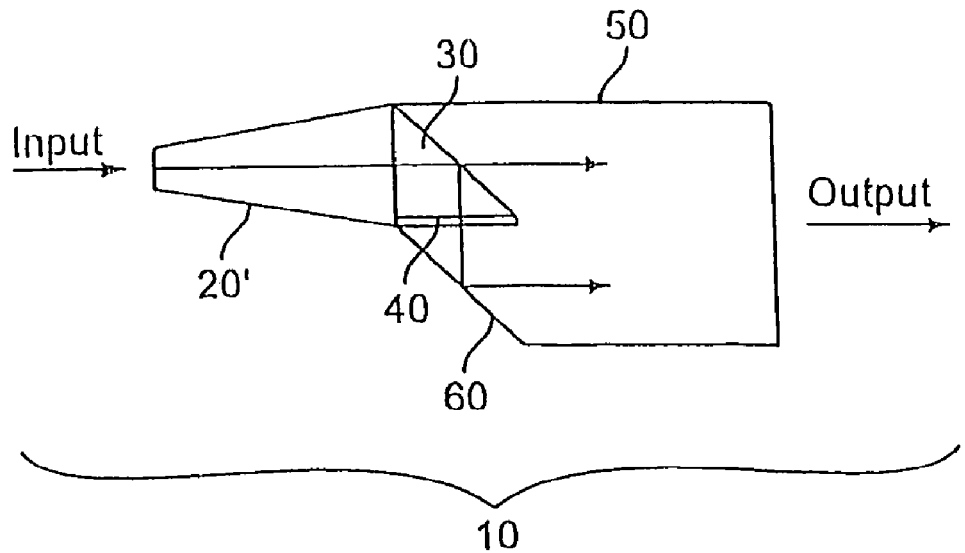
Figure 4:
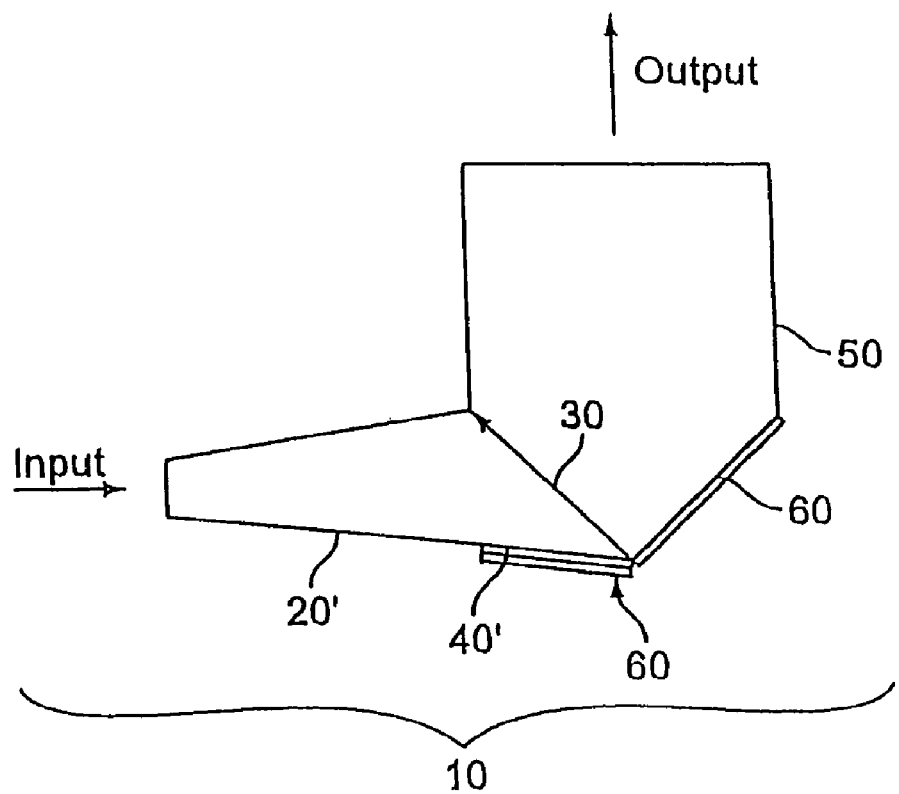
Figure 6:
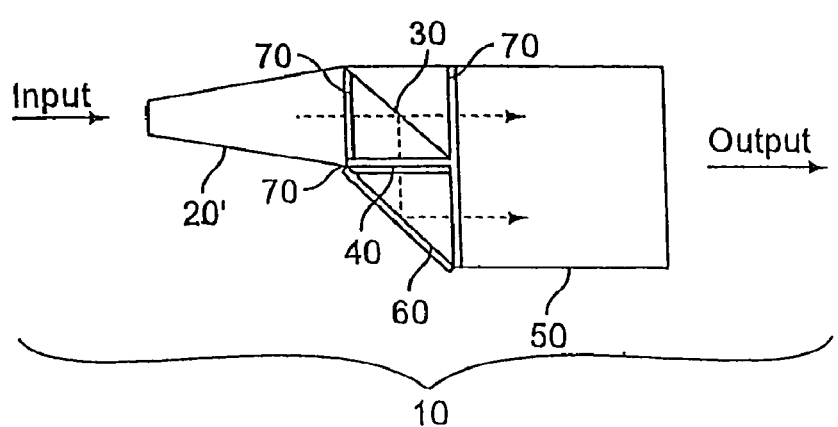

FIGS. 1, 3, and 6 illustrate one configuration of the waveguide polarization recovery system 10 in which the output light energy is substantially parallel with the input light energy. In this embodiment, the input waveguide 20 introduces unpolarized input light from a light source or LED light source at incidence to the PBS 30. The illustrated PBS 30 transmits p-polarized light, and so the p-polarized portion of the input light energy continues through in the same direction as the initial input while the s-polarized light is reflected in a perpendicular direction to the initial direction of input. The half-wave plate 40 is positioned to receive the reflected s-polarized light and convert it to p-polarized. Subsequently, mirror 60 redirects the converted energy from the half-wave plate 40 back to the initial direction of input. Both the transmitted light energy from the PBS 30 and the converted light energy from the half-wave plate 40 are recombined in the output waveguide and mixed. AS a result, the output light energy has a uniform intensity profile and is polarized. It should be appreciated that an output of the opposite polarization may be produced through the use of a PBS 30 that only transmits s-polarized light.

FIGS. 2, 4, and 7-8 illustrate an embodiment of the waveguide polarization recovery system 10 that has an alternative configuration in which the output light energy is perpendicular to the original input light energy. As in the embodiment of FIG. 1, the input waveguide 20 introduces unpolarized input light at incidence to the PBS 30. Furthermore, the PBS 30 performs the same function of transmitting the p-polarized light, and so the p-polarized portion of the input light energy continues through in the same direction as the initial input while the s-polarized light is reflected in a perpendicular direction to the initial direction of input. However, in the configuration of FIG. 2, one mirror 60 redirects the transmitted p-polarized portion of the input light energy by 90° toward the output waveguide 50. Furthermore, the reflected s-polarized light from the PBS 30 propagates once through a quarter-wave plate 40', and a second mirror 60 then returns the reflected light energy to the quarter-wave plate 40' for another pass. The second pass is also in the direction of the output waveguide 50. Because the reflected s-polarized light passes twice through the quarter-wave plate 40', s-polarized light is shifted by a half-wave to become p-polarized twice with the mirror as shown. Again, both p-polarized outputs will be mixed in the output waveguide, producing a uniform intensity output. The embodiment of FIG. 2 requires only two optical sections: A first section formed through the combination of the input waveguide 20, the PBS 30, the quarter-wave plate 40' and a mirror 60; and a second section formed through the combination of the output waveguide 50 and a second mirror 60. Therefore, the system has a simple design and a relatively low cost. Positioning the output light energy perpendicular to the original input light energy also has the advantage of allowing a more compact projection system, as described in greater detail below.

In contrast to the above-described configuration in which the wave plate 40 modifies the light energy reflected by the PBS 30, other configurations for the waveguide polarization recovery system 10 position the wave plate to modify the light energy transmitted by the PBS 30. For example, FIGS. 9 and 10 illustrate configurations in which the half-wave plate 40 is positioned to receive light energy transmitted by the PBS 30. In the configuration of FIG. 9, the half-wave plate 40 is optically positioned between a mirror 60 and the output waveguide 50. The half-wave plate 40 receives transmitted light energy that has first been redirected by a mirror 60. Similarly, in FIG. 10, the half-wave plate 40 is placed between the PBS 30 and mirror 60. In this way, the transmitted light energy from the PBS 30 is first repolarized before being redirected toward the output waveguide 50. The configurations of FIGS. 9-10 are advantageous because the input light energy only passes through the polarization layer of the PBS 30 once, thus reducing the loss of optical energy in the system 10. In contrast, the above-described configuration of the FIGS. 2, 4, and 7-8 requires some of the input light energy to pass through the PBS 30 twice.

The various configurations of the waveguide polarization recovery system 10 use the same elements, which are now described in greater detail.

The input waveguide 20 is typically an integrator that collects the light from a light source, such as an arc lamp, and mixes the light through multiple reflections to produce a more uniform intensity profile into the waveguide polarization recovery system 10. Likewise, the output waveguide 50 is typically an integrator that collects the light from the waveguide polarization recovery system 10 and mixes the light through multiple reflections to produce a more uniform intensity profile for illumination of the imager. The input waveguide 20 and the output waveguide 50 may be, for example, single core optic fibers fused bundles of optic fibers, fiber bundles, solid or hollow square or rectangular light pipes, or homogenizers, which can be tapered or un-tapered. In optical projection systems, the input waveguide 20 and the output waveguide 50 are typically rectangular in cross-section to correspond with the shape of the imager and the final projected image. The input waveguide 20 and the output waveguide 50 wave can be made from glass, quartz, or plastic depending on the power-handling requirement.

Either one or both of the input waveguide 20 and the output waveguide 50 can have an increasing or decreasing taper as needed for the projection system. For example, FIGS. 3-4 and 6-10 illustrate embodiments of the waveguide polarization recovery system 10 in which the input waveguide 20' is a tapered rod with the input cross-section matched to the area of the light source and the output cross-section related to the dimension of a LCD imager. The final dimensions for the input waveguide 20 may vary as needed to minimize stray light loss in the optical projection system. Similarly, FIG. 8 illustrates an embodiment of the waveguide polarization recovery system 10 in which the output waveguide 50' is also tapered. Tapering of the output waveguide 50' is advantageous because, depending on the performance parameters of the PBS 30, the wave plate 40, and the output requirements for the projection system, polarization recovery may not always be done at the same numerical aperture as the output aperture. The performances of the PBS 30 and the wave plate 40 are better at smaller numerical apertures, and as a result, advantageous increases in performance are achieved by transforming the input light energy into a larger area with a small numerical aperture and then transforming the light energy back into larger numerical aperture at the output of the output waveguide 50'. Overall, the tapering of the input wave guide 20 and the output waveguide 50 can be selected to match the overall performance requirements of the projection system, and similarly, the input and output waveguides can be tapered in either direction.

The waveguide polarization recovery system 10 further includes PBS 30. The PBS 30 is a well-known optical element that transmits light energy of one polarization while reflecting light energy of a different polarization. Typically, the PBS 30 is a rectangular prism of optically clear material, such as plastic or glass, that has a polarizing coating applied to the diagonal surface. Alternatively, the PBS 30 may be composed of a material that selectively transmit light energy depending on the polarization of the light energy. However, it should be appreciated that there exist numerous alternative designs and types of PBS, and any of these alternative PBS's may be employed in the waveguide polarization recovery system 10 of the present invention. Because the PBS 30 is a well known and commercially available item, it is not discussed further.

Another element of the waveguide polarization recovery system 10 is the wave plate 40. The wave plate 40 is an optically transparent component that modifies the polarization of light energy that passes through the wave plate 40. The wave plate 40 typically changes the propagating of light in one axis, thus changes the polarization. The wave plate 40 may be either a half-wave or quarter-wave as needed by the specific configuration of the waveguide polarization recovery system 10. Overall, the wave plate 40 is a well known and commonly available item and will not be discussed further.

The waveguide polarization recovery system 10 may further include one or more mirror 60 as needed to direct the light energy through the waveguide polarization recovery system 10. While mirrors are commonly known to be metal-coated glass surfaces or polished metal, the mirrors 60 should not be limited to this common definition for the purpose of this invention. Instead, mirrors 60 should be considered any optical component capable of reflecting or redirecting light energy. For example, mirrors 60 may be replaced with a light pipe, e.g., a prism or light pipes having a turn, e.g., 90° turn, (collectively referred to herein as a prism), that use the angle of incidence to capture and redirect light energy. For example, FIGS. 9 and 10 illustrate a waveguide polarization recovery system 10 that has a prism to guide or redirect light energy transmitted by the PBS 30 toward the output waveguide 50. For systems with small numerical apertures, total internal reflection at the prism can be used, and as a result, the coating is not necessary.

Figure 7:
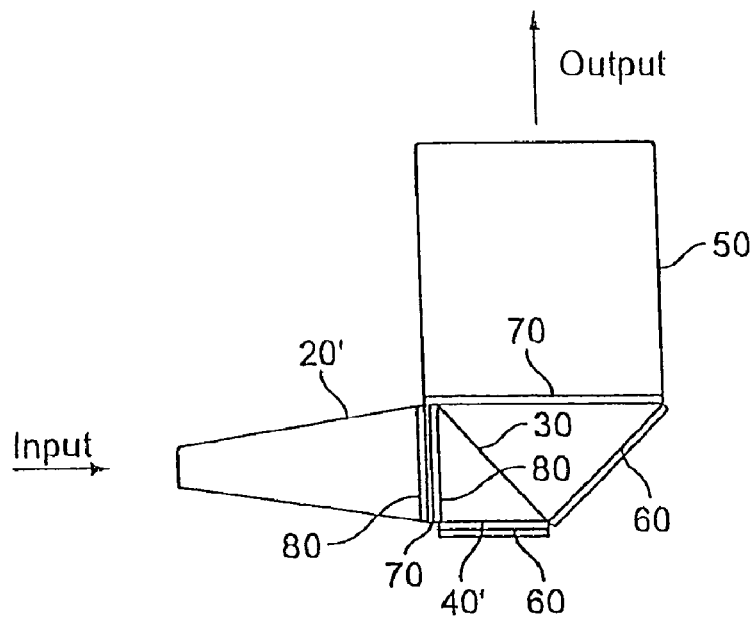
Figure 8:
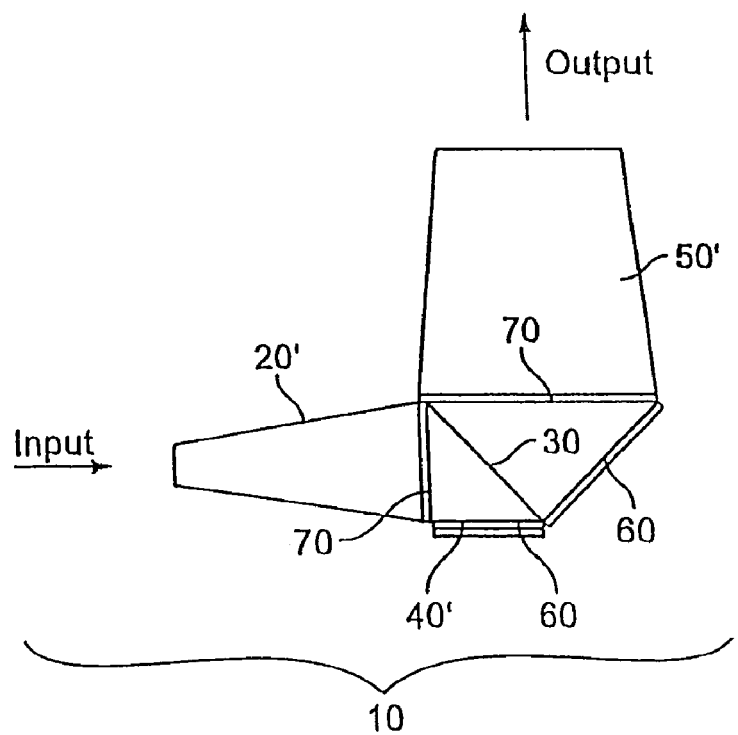
Figure 9:
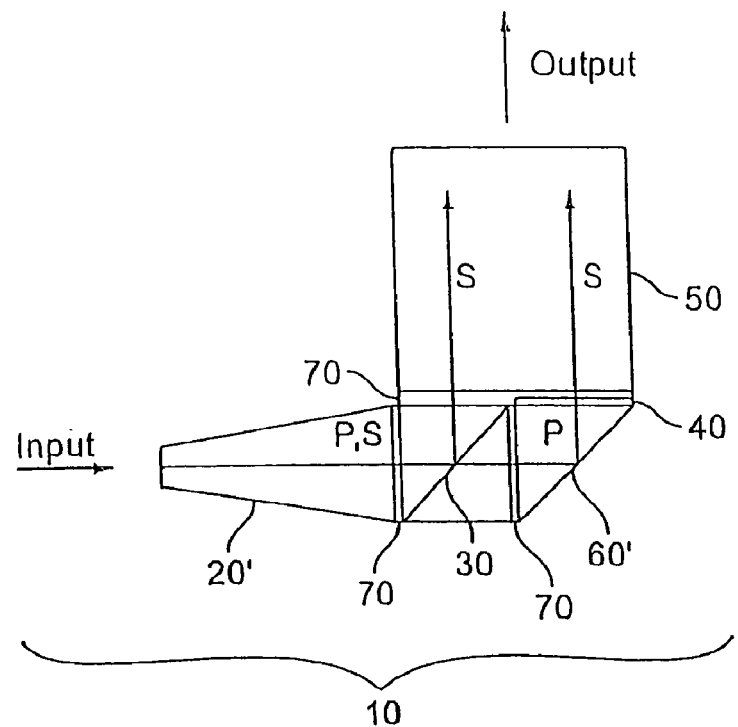
Figure 10:
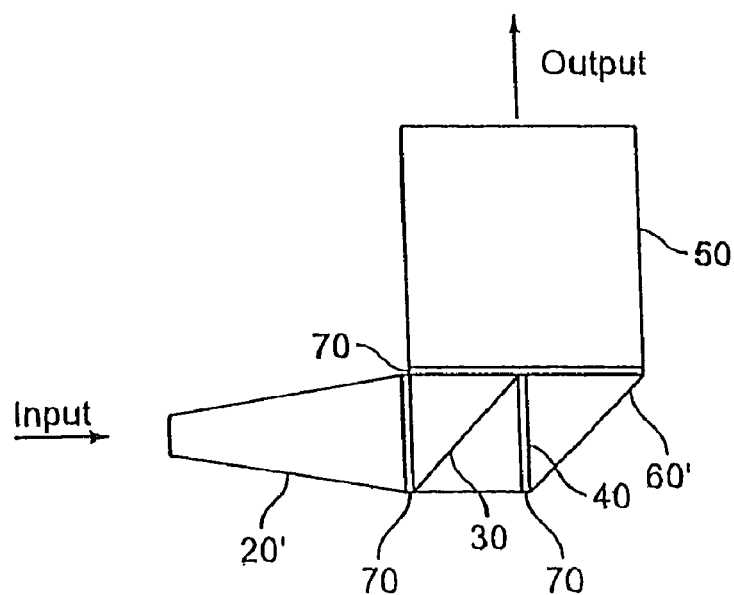

In another preferred embodiment of the present invention, illustrated in FIGS. 6-10, the waveguide polarization recovery system 10 further includes one or more optically clear area, low index glue, or "gaps" 70, between the other optical elements (collectively referred to herein as the gap). The gaps 70 may be pockets of air left between the optical components. The gap 70 can also be filled with low index epoxy or other transparent material such that the total internal reflection still occurs, but the assembly of the components will be simplified. For example, FIG. 6 illustrates a configuration having gap 70 between the input waveguide 20 and the PBS 30. This gap 70 ensures that light energy reflected by the diagonal PBS 30 is turned by 90° toward the quarter-wave plate 40' because total internal reflection from the interface between the PBS 30 and the gap 70 prevents the light energy from returning instead to the input waveguide 20 and exiting as a loss. The waveguide polarization recovery system 10 in FIG. 6 also has other gaps 70 to promote total internal reflection between the different optical elements. Similarly, FIG. 7 illustrates a waveguide polarization recovery system 10 in which gaps 70 have been added to a polarization recovery system with a tapered input waveguide 20 and perpendicularly configured output waveguide 50 illustrated in FIG. 4. Again these gaps 70 increase the efficiency by encouraging total internal reflection between the optical components. As illustrated in FIGS. 6-7, the gaps 70, while increasing the efficiency of the system, cause the waveguide polarization recovery system 10 to become more complex with an increased number of discrete parts.

In the above-described configurations of FIG. 9-10, the gaps 70 further serve the purpose of improving the performance of the prism 60' that serves as a mirror to direct the light energy toward the output waveguide 50. In particular, the gap 70 is needed between the PBS 30 and the prism 60' such that the light reflected from the hypotenuse of the prism 60', back toward the PBS 30, hits this interface of the gap 70 and is internally reflected toward the output waveguide 50. In this way, efficiency of the system is improved by minimizing loss.

The performance advantages of the gaps 70 may be further increased through the use of anti-reflection coating on both surfaces such that the transmitted light suffers minimal loss.

Figure 5:
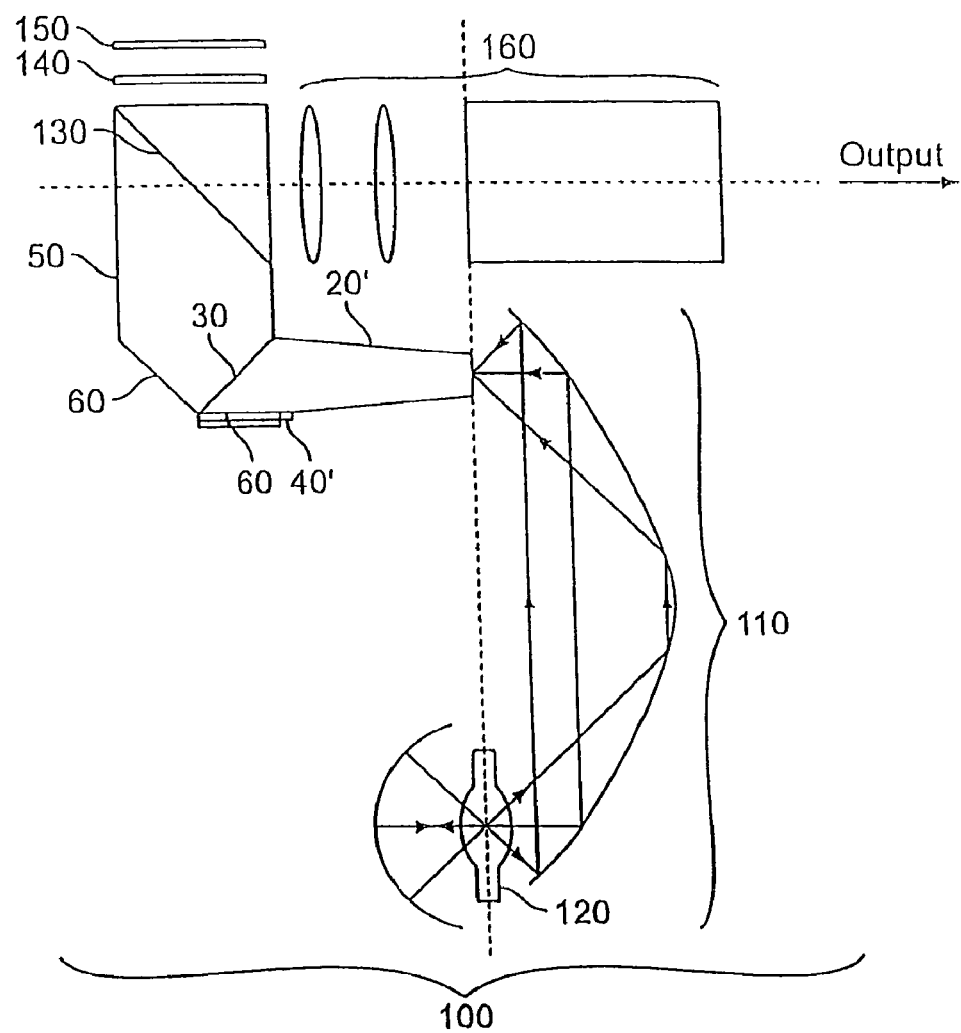
FIG. 5 is a schematic diagram of a compact projection device incorporating the polarization recovery system in accordance with an embodiment of the present invention.

FIG. 5 illustrates a projector 100 that employs the waveguide polarization recovery system 10. The projector 100 consists of a light collecting system 110, which is this illustrated example has two paraboloid reflectors and a retro-reflector that increase the output by reflecting the light from a light source 120 back into itself. The arc of the light source 120 is placed at a focus of the first paraboloid reflector and the proximal end of the input waveguide 20 is at the focus of the second paraboloid reflector. It should be appreciated that this light collection system 110 is provided merely for illustration, and many other light collection systems are known and may be used. Likewise, the light source 120 may be an arc lamp, such as xenon, metal-halide lamp, HID, or mercury lamps, or a filament lamp, such as a halogen lamp, provided that the system is modified to accommodate the non-opaque filaments of the lamp.

Within the illustrated projector 100, the input waveguide 20 is a tapered light pipe that is designed to match the light input collected from the light collecting system 110 to the optical needs of an LCD imager 150. As described above in FIG. 4, the light output of the input waveguide 20 is polarized by the PBS 30 and the other polarization is recovered by the quarter-wave plate 40'. The output waveguide 50 then directs the polarized optical energy toward the LCD imager 150. In this case, the light output in the output waveguide 50 is then incident into a second PBS 130 whose orientation is matched to the polarization of the incident light to minimize the loss. A color wheel 140, or other type of color section system, and the reflective LCD imager 150 create the projected image by the projection lenses 160 in a traditional manner. As shown in FIG. 5, the number of optical elements is minimal and, as the result, the cost for the projector is relatively low.

It should be appreciated that the waveguide polarization recovery system 10 may be used in other types of projection systems. For example, the projector may also use two or three imagers 150 to define the projected image. The imager 150 may also be a reflective display using liquid crystal on silicon ("LCOS") technology, or any other type of systems that requires polarized systems.

Figure 11:
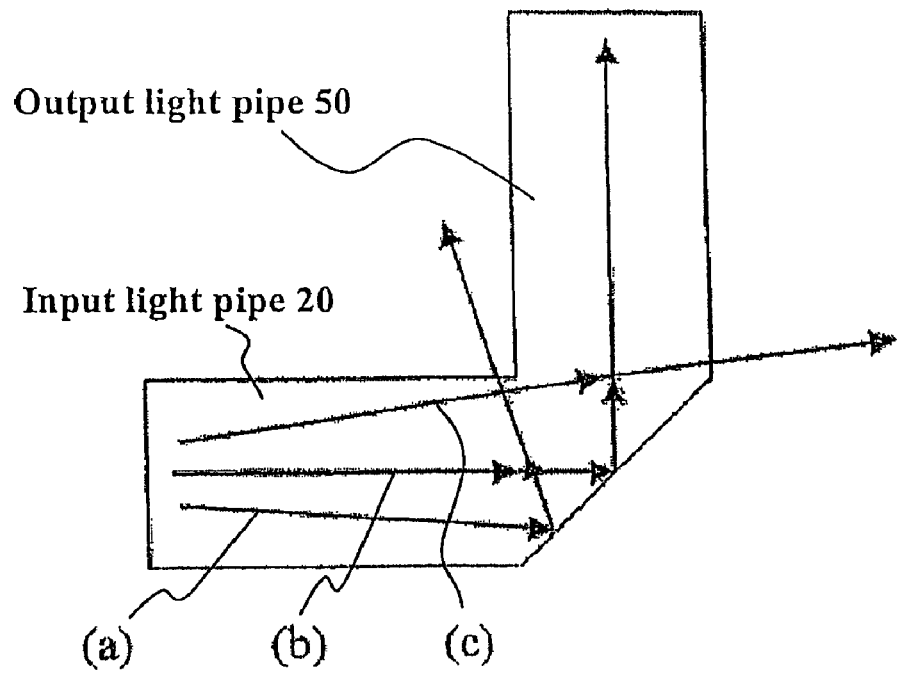
FIG. 11 is a schematic diagram of a light pipe comprising a 90° turn without an air gap or low index glue.
Figure 12:
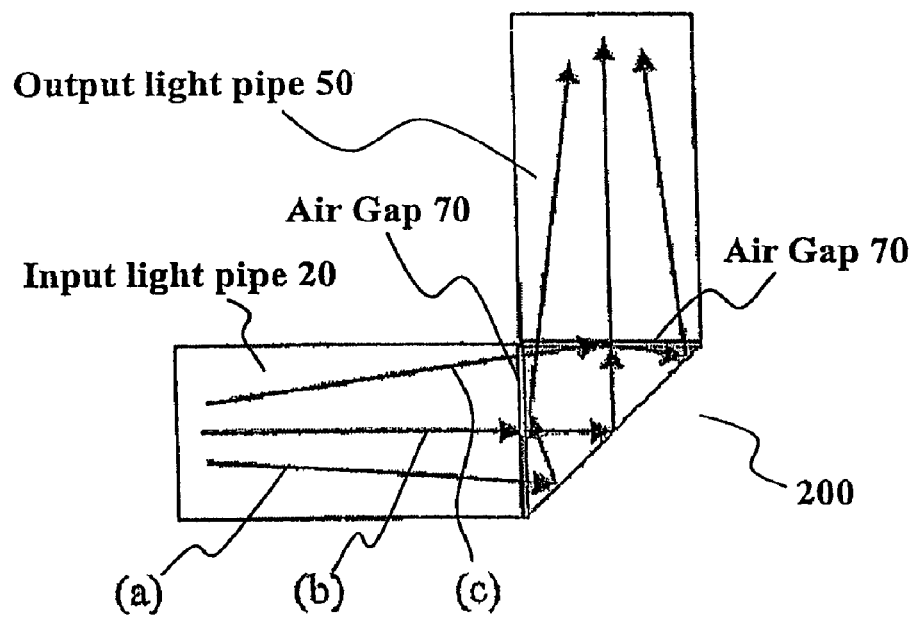
FIG. 12 is a schematic diagram of a light pipe comprising a 90° turn with air gaps or low index glue in accordance with an embodiment of the present invention.

Turning now to FIG. 11, there are illustrated light pipes 20, 50 with a turn, e.g., 90° turn, without an air gap or low index glue, and various light paths inside the light pipes. Some high angle light will be lost, thus reducing the efficiency of the light pipe system. In accordance with an embodiment of the present invention, the light pipe system 200 comprises light pipes 20, 50 comprising air gaps or low index glue 70 as shown in FIG. 12. The light, e.g., light paths (a) and (c), that are lost in FIG. 11 are recaptured by total internal reflection and collected by the output light pipe 50 of the light pipe system 200.

Figure 13A:
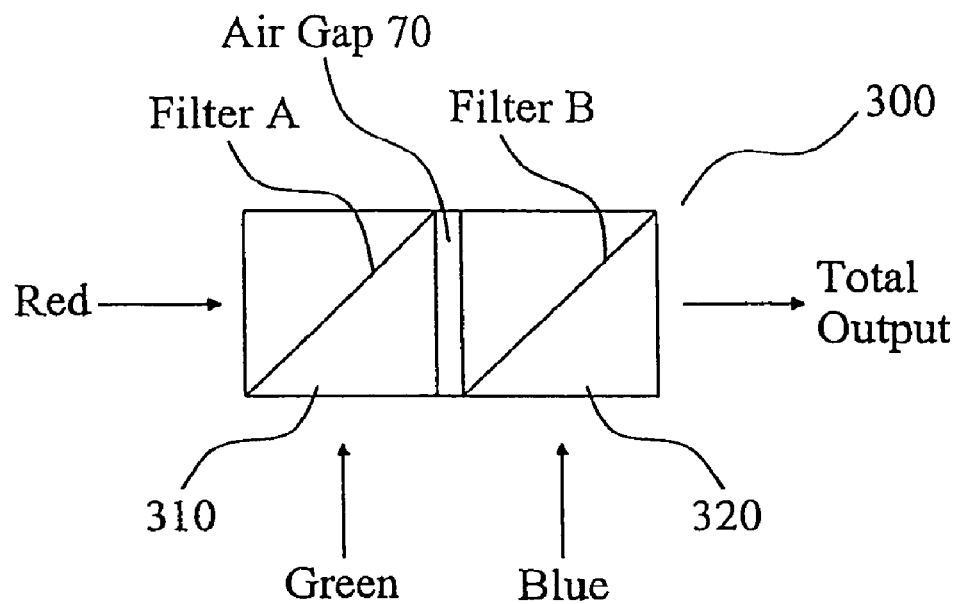
FIG. 13A-B are schematic diagrams of a light pipe based color system in accordance with an embodiment of the present invention.

In accordance with an embodiment of the present invention, as shown in FIG. 13A, the color system 300 comprises beam combiners 310, 320, air gaps or low index glue 70 and three light sources, namely, red (R), green (G), and blue (B). Each light input is coupled directly or indirectly through a light pipe or lens system 200 (not shown but such as one shown in FIG. 12), into the color system 300. Each beam combiner comprises a filter and two prisms or beam splitters, preferably triangular prisms with all of the surfaces polished. The first beam combiner 310 with filter A transmits red light (R) and reflects green light (G). It is appreciated that the filter A is controlled, tuned or selected to transmit red light (R) and reflect green light (G). The red light (R) from the input is transmitted by the first combiner 310 and the green light (G) from the other face of the first combiner 310 is reflected. The reflected green light (G) combines with the transmitted red light (R) and exit together out of the same face of the combiner 310. The combined red/green light (R, G) then enters the second combiner 320 with a filter B, which transmits the red and green light (R, G), and reflects the blue light (B). It is appreciated that the filter B is controlled, tuned or selected to transmit red and green light (R, G) and reflect the blue light (B). As a result, the red/green light will continue to pass through the second combiner 320 and the blue light (B) from the blue input is reflected by the second combiner 320. The reflected blue light (B) combines with the transmitted red and green light (R, G) and the combined light (R, G, B) exit the color system 300 together. It is appreciated that the output intensity and color are controlled by the amount of each color light inputted into the color system 300. Additionally, it is appreciated that the placement of light source is arbitrary and depends on the application of the color system 300. That is, instead of green light (G) being inputted to the first beam combiner 310, the blue light (B) can be inputted to the first beam combiner 310 provided that the filter A is now tuned to reflect blue light (B) instead of green light (G). The output beam of the color system 300 of the present invention occupies the same cross-section area of an individual input beam, thus preserving the same etendue of a single light source. The efficient coupling of the light is accomplished by providing an air gap or low index glue 70 between the various optical components, such the beam combiners 310, 320. In accordance with an aspect of the present invention, the combined output beam of the color system 300 of the present invention can be used for fiber optic illuminations or for projection display applications, e.g., a light engine for a projection display system.

Figure 13B:
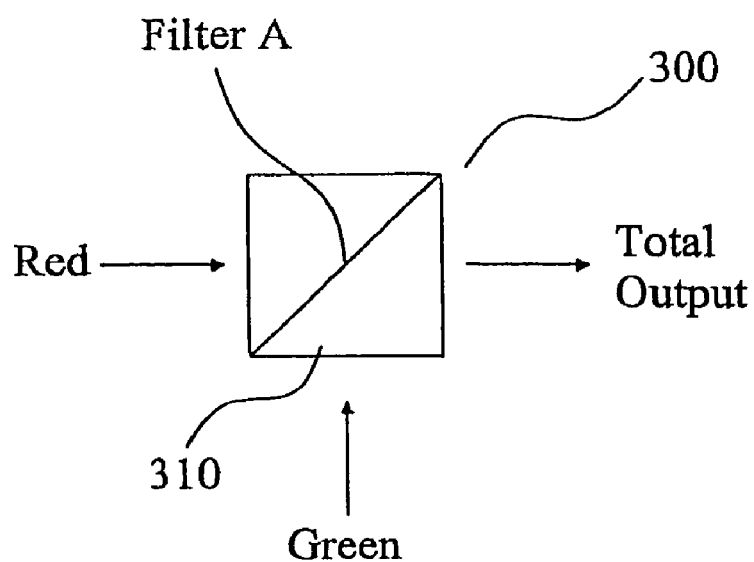

In accordance with an embodiment of the present invention, as shown in FIG. 13B, the color system 300 comprises a beam combiner 310 and two light sources, namely, red (R) and green (G). Each light input is coupled directly or indirectly through a light pipe or lens system 200 (not shown but such as one shown in FIG. 12), into the color system 300. Each beam combiner comprises a filter and two prisms or beam splitters, preferably triangular prisms with all of the surfaces polished. The beam combiner 310 with filter A transmits red light (R) and reflects green light (G). It is appreciated that the filter A is controlled, tuned or selected to transmit red light (R) and reflect green light (G). The red light (R) from the input is transmitted by the first combiner 310 and the green light (G) from the other face of the first combiner 310 is reflected. The reflected green light (G) combines with the transmitted red light (R) and exit together out of the same face of the combiner 310. It is appreciated that the output intensity and color are controlled by the amount of each color light inputted into the color system 300. Additionally, it is appreciated that the placement of light source is arbitrary and depends on the application of the color system 300. That is, instead of green light (G) being inputted to the beam combiner 310, the blue light (B) can be inputted to the beam combiner 310 provided that the filter A is now tuned to reflect blue light (B) instead of green light (G). The output beam of the color system 300 of the present invention occupies the same cross-section area of an individual input beam, thus preserving the same etendue of a single light source. The efficient coupling of the light is accomplished by the reflective polished surfaces of the triangular prisms. In accordance with an aspect of the present invention, the combined output beam of the color system 300 of the present invention can be used for fiber optic illuminations or for projection display applications, e.g., a light engine for a projection display system.

Figure 14:
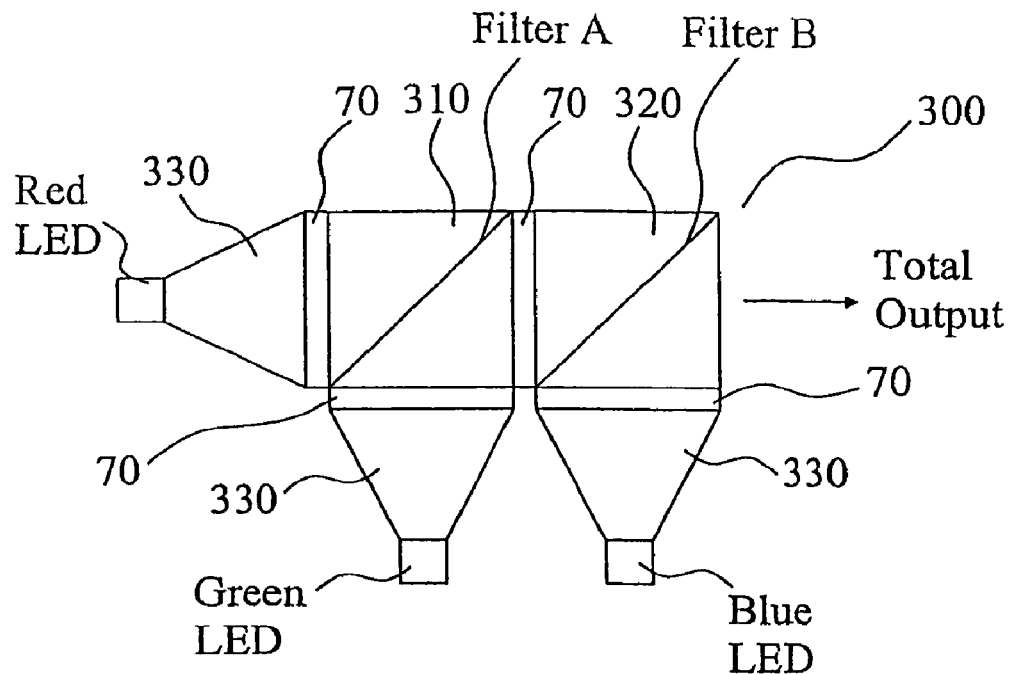
FIG. 14 is a schematic diagram of a light pipe based color system in accordance with an embodiment of the present invention.
Figure 17:
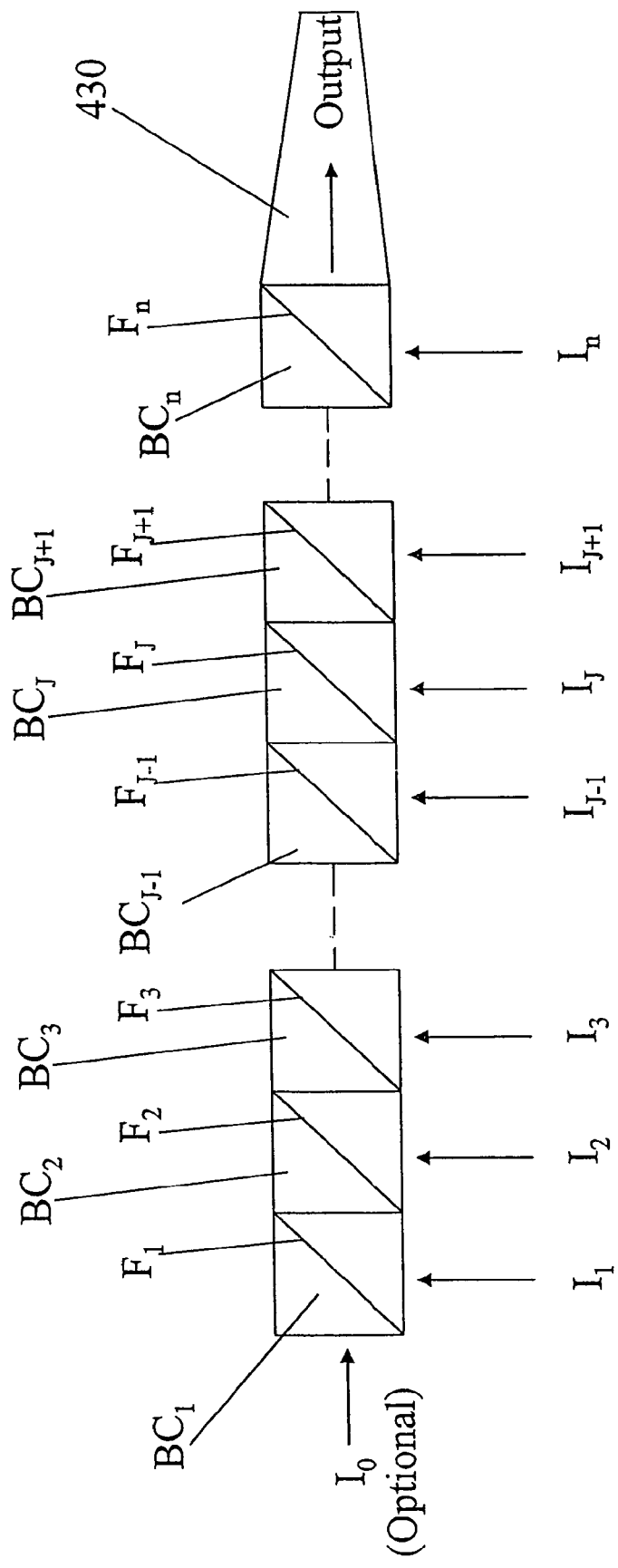
FIG. 17 is a schematic diagram of a light pipe based color system comprising an array of LED sources in accordance with an embodiment of the present invention.

In accordance with an embodiment of the present invention, each input light source (R, G or B) in FIG. 13A-B is a LED light source coupled to a straight or tapered light pipe 330, as shown in FIG. 14. Although a tapered up light pipe 330 is shown in FIG. 14, it is appreciated that a tapered down light pipe 330 can be also utilized. As shown in FIG. 17, it is appreciated that the light sources can be a plurality of LED lights sources or arrays of LED light sources $I_1$-$I_n$, each providing light with different color or wavelength where $n \geq 2$. Optionally, a light source $I_0$ can be provided as an input to the beam combiner $BC_1$ which transmits the light from the light source $I_0$ to the next beam combiner $BC_2$. Light or light energy from each light source $I_j$ is reflected by the corresponding beam combiner $BC_j$ comprising a filter $F_j$ matching the wavelength of the light from the corresponding light source $I_j$. The reflected light $I_j$ combines with the transmitted light $I_0 \ldots I_{j-1}$ and the combined light $I_0 \ldots I_j$ then enters the next beam combiner $BC_{j+1}$. Finally the combined light $I_0 \ldots I_n$ exits the beam combiner $BC_n$ and enters the straight, tapered up or tapered down output light pipe 430. Although not shown, each light source can be coupled to a straight, tapered up or tapered down light pipe 330 as shown in FIG. 14.

When enhanced or better color is required by a particular application of the present invention, a plurality of LEDs which generate various colors can be used so that a large area is covered in the color coordinate space. In a projection display system, a 6-colored system has been known to provide more vivid and saturated colors. In accordance with an embodiment of the present invention, a n-colored projection display system comprises a n different LED light sources ($I_1 \ldots I_n$) providing n different colored light or lights with n different wavelengths, as shown in FIG. 17. The filter $F_j$ is controlled, tuned or selected to match the wavelength $\lambda_j$ of the LED light source $I_j$ such that it reflects only light having wavelength $\lambda_j$.

In accordance with an exemplary embodiment of the present invention, the brightness of the output light can be controlled and increased with appropriate selection of the filters and light sources to provide a more vivid and intense colors. For example, each filter $F_j$ can be controlled, tuned or selected to filter out the low-intensity portion of the light or light energy from the corresponding light or LED source, thereby propagating only high-intensity portion of the light and resulting in a brighter output beam.

Figure 19:
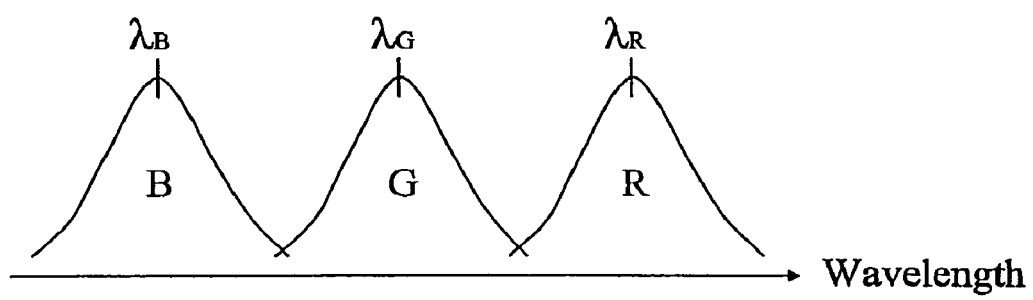
FIG. 19 is a graph illustrating the peak or high intensity sections of blue, green and red light.
Figure 20:
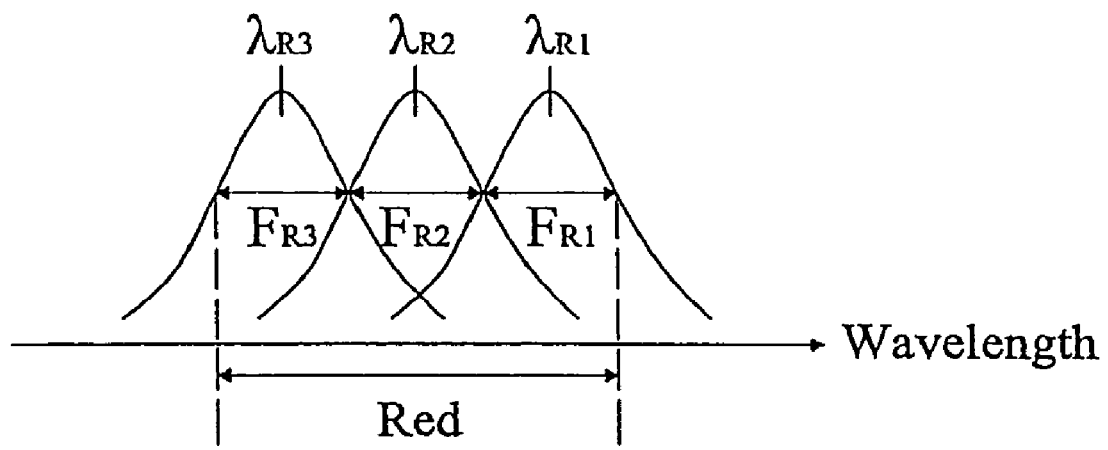
FIG. 20 is a graph illustrating the red light formed from combining three different red lights having different high intensity sections.

In accordance with an exemplary embodiment of the present invention, as shown in FIG. 20, multiple LED light sources can be used to enhance a single color, e.g., red. Typically, as shown in FIG. 19, each light has a high-intensity section, e.g., the red light has a high-intensity section $\lambda_R$ and the blue light has a high-intensity section $\lambda_B$. For example, three different red lights $R_1$, $R_2$ and $R_3$ respectively having high-intensity sections $\lambda_{R1}$, $\lambda_{R2}$ and $\lambda_{R3}$ are combined to form a single high-intensity red light to be inputted into the X-cube 410 or the beam combiner 310, 320 or $BC_j$. The corresponding filters $F_{R1}$, $F_{R2}$ and $F_{R3}$ respectively filter out the low-intensity sections of the red lights $R_1$, $R_2$ and $R_3$.

Figure 15:
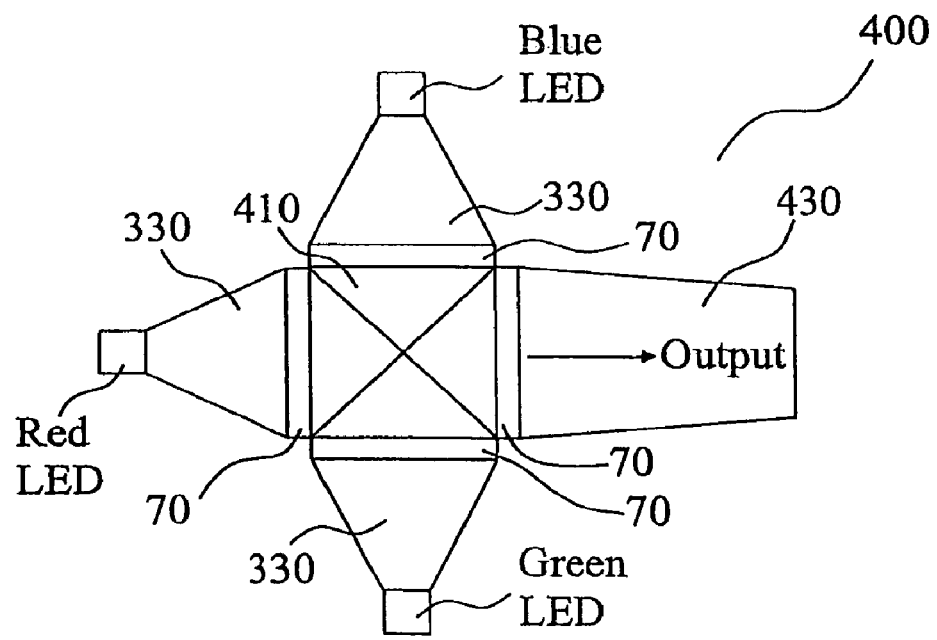
FIG. 15 is a schematic diagram of a light pipe based color system comprising a X-cube in accordance with an embodiment of the present invention.
Figure 16:
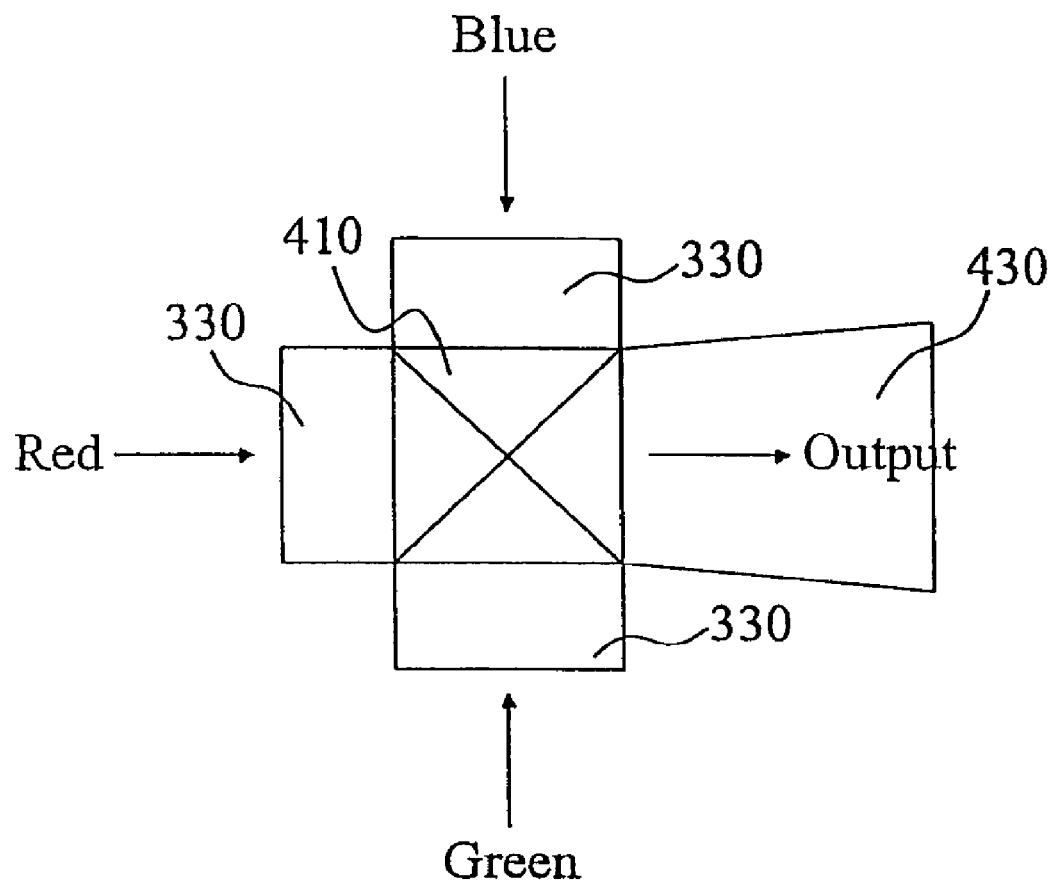
FIG. 16 is a schematic diagram of a light pipe based color system comprising a X-cube in accordance with an embodiment of the present invention.

In accordance with an embodiment of the present invention, as shown in FIGS. 15 and 16, the color system 400 comprises a X-cube color combiner 410 (or X-cube 410) for combining beams of light without increasing the etendue of the color system 400. Each light source (FIG. 16) or a LED light source (FIG. 15) is coupled to a straight, tapered up or tapered down light pipe 420. The red light (R) from the red light source or red LED light source enters the X-cube 410 from a first input face of the X-cube 410 via the straight, tapered up or tapered down light pipe 420. The red light (R) is transmitted by the X-cube 410 and exits out of the output face of the X-cube 410 and into a straight, tapered up or tapered down output light pipe 430. The green light (G) from the green light source or the green LED light source enters the X-cube 410 from a second input face of the X-cube 410 via the straight, tapered up or down light pipe 420. The X-cube 410 reflects the green light (G). The reflected green light (G) combines with the transmitted red light (R) and exit together out of the same output face of the X-cube 410 and into the straight, tapered up or tapered down output light pipe 430. The blue light (B) from the blue light source or the blue LED light source enters from a third input face of the X-cube 410 via the straight, tapered up or tapered down light pipe 420. The X-cube reflects the blue light (B). The reflected blue light (B) combines with the transmitted red light (R) and the reflected green light (G), and exit together out of the same output face of the X-cube 410 and into the straight, tapered up or tapered down output light pipe 430. The light pipes 420, 430 can be, for example, single core optic fibers fused bundles of optic fibers, fiber bundles, solid or hollow square or rectangular light pipes, or homogenizers, which can be tapered up, tapered down or un-tapered. It is appreciated that the output intensity and color are controlled by the amount of each color light inputted by the corresponding light source or LED light source into the color system 400. Additionally, it is appreciated that the placement of light source is arbitrary and depends on the application of the color system 400. That is, instead of green light (G) being inputted to the second input face of the X-cube 410, the red light (R) can be inputted to the second input face of the X-cube 410. The output beam of the color system 400 of the present invention occupies the same cross-section area of an individual input beam, thus preserving the same etendue of a single light source. The efficient coupling of the light is accomplished by providing an air gap or low index glue 70 between the various optical components, such as X-cube and the straight, tapered up or tapered down light pipes 420, 430. In accordance with an aspect of the present invention, the combined output beam of the color system 400 of the present invention can be used for fiber optic illuminations or for projection display applications, e.g., a light engine for a projection display system.

In accordance with an aspect of the present invention, the efficient coupling of the light is accomplished by providing an air gap or low index glue 70 between the various optical components, such as light pipes 20, 50, 330, prisms and beam combiners 310, 320, $BC_1$-$BC_n$. These air gaps or low index glue 70 provide total internal reflections for angled light to be reflected back into the color system 300 which would otherwise be lost, thereby minimizing or eliminating loss of light or light energy.

One of ordinary skill in the art would appreciate that other configurations that follows the same concept of this invention can be created with different set of filters and positions of the light source. The sequence of two or n colors can be varied. The entry point of the colored LEDs can also be varied.

In accordance with an embodiment of the present invention, a method for multi-colored illumination comprises the steps of combining by a first beam combiner 310 a first light (R) transmitted by a first filter A and a second light (G) reflected by the first filter A to provide a combined beam; combining by a second beam combiner 320 the combined beam transmitted by a second filter B and a third light (B) reflected by the second filter B to provide an output beam, each light having different wavelength; and providing a low index glue or air gap 70 between the beam combiners 310, 320, thereby combining the lights without increasing etendue.

In accordance with an embodiment of the present invention, a method for multi-colored illumination comprises the steps of combining by an X-cube 410 at least two lights having two different wavelengths received from corresponding two light pipes 330; and providing a low index glue or air gap 70 between each light pipe 330 and the X-cube 410, thereby combining the lights without increasing etendue.

Figure 18:
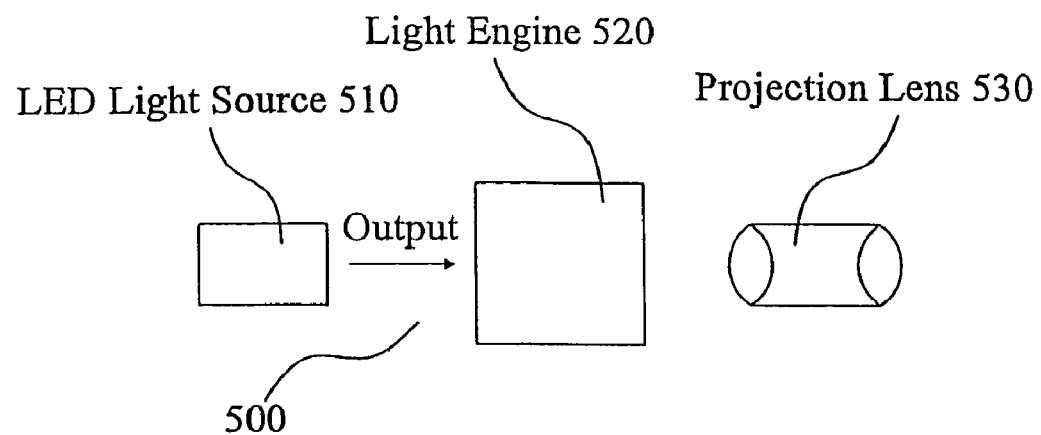
FIG. 18 is a schematic diagram of a projection system incorporating the light pipe system of the present invention.

Turning now to FIG. 18, in accordance with am embodiment of the present invention, there is illustrated a schematic diagram of the light projection system incorporating the light pipe base d color system of the present invention. The output from the LED light source 510, e.g., any of the color systems described herein, is inputted into the projection engine 520 (e.g., digital light processing (DLP), liquid crystal on silicon (LCOS), high temperature poly-silicon (HTPs), and the like) which creates the projected image by the projection lens 530 in a traditional manner. In accordance with an aspect of the present invention, the projection engine 520 comprises at least one modulator panel for modulating light in accordance with a display signal and the projection lens 530 projects the modulated light onto a display screen.

For fiber optics application where the fibers are usually round, the system can also be implemented using round prisms and filters.

Although solid tapered light pipes 330, 420, 430 are shown in FIGS. 14, 15 and 17, other coupling configurations including compound parabolic concentrators (CPC's), lenses, solid or hollow CPC or light pipes, and any other imaging or non-imaging systems can be used. In accordance with an embodiment of the present invention, the tapered light pipe has a lensed output surface. In accordance with an embodiment of the present invention, the input of the light pipe is also shaped to increase the coupling efficiency from the LED light source.

While the present invention has been particularly described with respect to the illustrated embodiment, it will be appreciated that various a Iterations, modifications and adaptations may be made based on the present disclosure, and are intended to be within the scope of the present invention. It is intended that the appended claims be interpreted as including the embodiments discussed above, those various alternatives, which have been described, and all equivalents thereto.

I claim:

1. A multi-colored illumination system, comprising:
   n beam combiners for combining n+1 lights forming a combined beam, each light having different wavelengths, where n is greater than 2, each beam combiner comprising two triangular prisms, each surface of said two triangular prisms being polished, and a filter for transmitting said combined beam received from a previous beam combiner and reflecting a new light from said n+1 lights which has not been previously transmitted or reflected, said each beam combiner combining said transmitted combined beam and said reflected new light to provide a new combined beam to a next beam combiner if said each beam combiner is not the last beam combiner or output said new combined beam as an output beam if said each beam combiner is the last beam combiner; and
   a low index glue or air gap being provided between each of said beam combiners, thereby combining all of said lights without increasing etendue of said multi-colored illumination system.

2. The system of claim 1, wherein each light is a light-emitting diode (LED) or an array of LEDs.

3. The system of claim 2, further comprising a light pipe associated with each LED or array of LEDs.

4. The system of claim 3, wherein said light pipe is one of the following: a straight light pipe, a tapered up light pipe or a tapered down light pipe.

5. The system of claim 3,
   wherein each beam combiner is an X-cube comprising four triangular prisms with each surface of each triangular prism being polished; and further comprising a low index glue or air gap between each of said light pipe and said X-cube, thereby combining said lights without increasing etendue of said multi-colored illumination system.

6. The system of claim 5, further comprising an output light pipe positioned to receive a substantial portion of the output beam.

7. The system of claim 6, wherein said output light pipe is one of the following: a straight light pipe, a tapered up light pipe or a tapered down light pipe.

8. The system of claim 7, further comprising a low index glue or air gap between said output light pipe and said X-cube.

9. The system of claim 5, wherein each of said light pipe is one of the following: a straight light pipe, a tapered up light pipe or a tapered down light pipe.

10. A light engine for a projection display system comprising the multi-colored illumination system of claim 5.

11. The light engine of claim 10, wherein said light engine is one of the following: digital light processing (DLP), liquid crystal on silicon (LCOS) or high temperature poly-silicon (HTP).

12. A projection display system comprising the light engine for a projection display system of claim 11; further comprising at least one light modulator panel for modulating light in accordance with a display signal; and a projection lens for projecting the modulated light onto a display screen.

13. The system of claim 1, further comprising an output light pipe positioned to receive a substantial portion of said output beam.

14. The system of claim 13, wherein said output light pipe is one of the following: a straight light pipe, a tapered up light pipe or a tapered down light pipe.

15. The system of claim 13, further comprising a low index glue or air gap between said output light pipe and said beam combiner.

16. A light engine for a projection display system comprising the multi-colored illumination system of claim 1.

17. The light engine of claim 16, wherein said light engine is one of the following: digital light processing (DLP), liquid crystal on silicon (LCOS) or high temperature poly-silicon (HTP).

18. A projection display system comprising the light engine for a projection display system of claim 16; at least one light modulator panel for modulating light in accordance with a display signal; and a projection lens for projecting the modulated light onto a display screen.

* * * * *